(12) United States Patent
Kirkman

(10) Patent No.: US 7,958,751 B2
(45) Date of Patent: Jun. 14, 2011

(54) PLUNGER FOOT ASSEMBLY FOR A GLASSWARE FORMING MACHINE

(75) Inventor: Thomas R. Kirkman, Napoleon, OH (US)

(73) Assignee: Owens-Brockway Glass Container, Inc., Perrysburg, OH (US)

( * ) Notice: Subject to any disclaimer, the term of this patent is extended or adjusted under 35 U.S.C. 154(b) by 782 days.

(21) Appl. No.: 11/903,474

(22) Filed: Sep. 24, 2007

(65) Prior Publication Data

US 2009/0078005 A1    Mar. 26, 2009

(51) Int. Cl.
*C03B 7/086* (2006.01)
(52) U.S. Cl. ............................ 65/322; 65/362
(58) Field of Classification Search .................. 65/129, 65/330–332, 126, 328, 362
See application file for complete search history.

(56) References Cited

U.S. PATENT DOCUMENTS

| | | | |
|---|---|---|---|
| 3,314,775 A | | 4/1967 | De Shetler et al. |
| 4,272,273 A | | 6/1981 | Trahan et al. |
| 4,274,859 A | * | 6/1981 | Mumford .................. 65/314 |
| 5,028,249 A | | 7/1991 | Trahan et al. |
| 5,057,139 A | | 10/1991 | Stankosky et al. |
| 5,334,233 A | | 8/1994 | Kozora |
| 5,411,564 A | * | 5/1995 | Bolin ............................. 65/68 |
| 5,632,796 A | | 5/1997 | Kuz et al. |
| 5,853,449 A | | 12/1998 | Pilskaer et al. |
| 5,858,049 A | | 1/1999 | Borbone |
| 5,964,914 A | * | 10/1999 | Stenholm et al. .............. 65/171 |
| 6,170,294 B1 | | 1/2001 | Mann et al. |
| 2005/0252245 A1 | * | 11/2005 | Bogert et al. ................. 65/362 |

FOREIGN PATENT DOCUMENTS

| | | |
|---|---|---|
| GB | 1072179 | 6/1967 |
| GB | 2115803 A | 9/1983 |

* cited by examiner

*Primary Examiner* — Matthew J Daniels
*Assistant Examiner* — Yana Belyaev

(57) ABSTRACT

A plunger foot assembly includes a preassembled gearbox for mounting on a section box base plate of a glassware forming machine. The preassembled gearbox has an input and an output gear with an internally threaded central opening. A hollow externally threaded shaft is threadably coupled to and extends from the internally threaded opening of the output gear. A plunger support is mounted on the hollow externally threaded shaft such that rotation of the output gear of the gearbox raises and lowers the plunger support. The plunger support has an upper face for mounting at least one plunger with air ports of the plunger opening at the face of the support. The plunger support also has air passages for feeding plunger up, plunger down and plunger cooling air to the air ports of a plunger mounted on the plunger support, and a cooling air exhaust passage for feeding cooling air exhaust from the plunger mounted on the support to the hollow interior of the externally threaded shaft. At least one telescoping tube assembly has a base for mounting on the section box base plate, and telescoping tubes with inlet ports for receiving plunger up, plunger down and plunger cooling air and outlets coupled to the air passages in the plunger support.

12 Claims, 8 Drawing Sheets

US 7,958,751 B2

PLUNGER FOOT ASSEMBLY FOR A GLASSWARE FORMING MACHINE

The present disclosure relates to a plunger foot assembly for raising and lowering the plunger(s) of a press-and-blow glassware forming machine.

BACKGROUND AND SUMMARY OF THE DISCLOSURE

In press-and-blow glassware forming machines, a molten glass gob is fed into a blank mold and a plunger is moved into the blank mold to form the molten glass against the confines of the blank mold cavity. The glass blank or parison formed in the blank mold is then transferred to a blow mold for further processing. At the blank mold stage, the plunger, or the plungers in a multiple-cavity forming machine, are carried by a plunger foot assembly for adjusting plunger height to accommodate blank molds of differing sizes and/or for retracting the plunger(s) for maintenance or repair. A general object of the present disclosure is to provide an improved plunger foot assembly.

The present disclosure embodies a number of aspects that can be implemented separately from or in combination with each other.

A plunger foot assembly in accordance with one aspect of the present disclosure includes a preassembled gearbox for mounting on a section box base plate of a glassware forming machine. The preassembled gearbox has an input and an output gear with an internally threaded central opening. A hollow externally threaded shaft is threadably coupled to and extends from the internally threaded opening of the output gear. A plunger support is mounted on the hollow externally threaded shaft such that rotation of the output gear of the gearbox raises and lowers the plunger support. The plunger support has an upper face for mounting at least one plunger with air ports of the plunger opening at the face of the support. The plunger support also has air passages for feeding plunger up, plunger down and plunger cooling air to the air ports of a plunger mounted on the plunger support, and a cooling air exhaust passage for feeding cooling air exhausted from the plunger mounted on the support to the hollow interior of the externally threaded shaft. At least one telescoping tube assembly has a base for mounting on the section box base plate, and telescoping tubes with inlet ports for receiving plunger up, plunger down and plunger cooling air and outlets coupled to the air passages in the plunger support.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
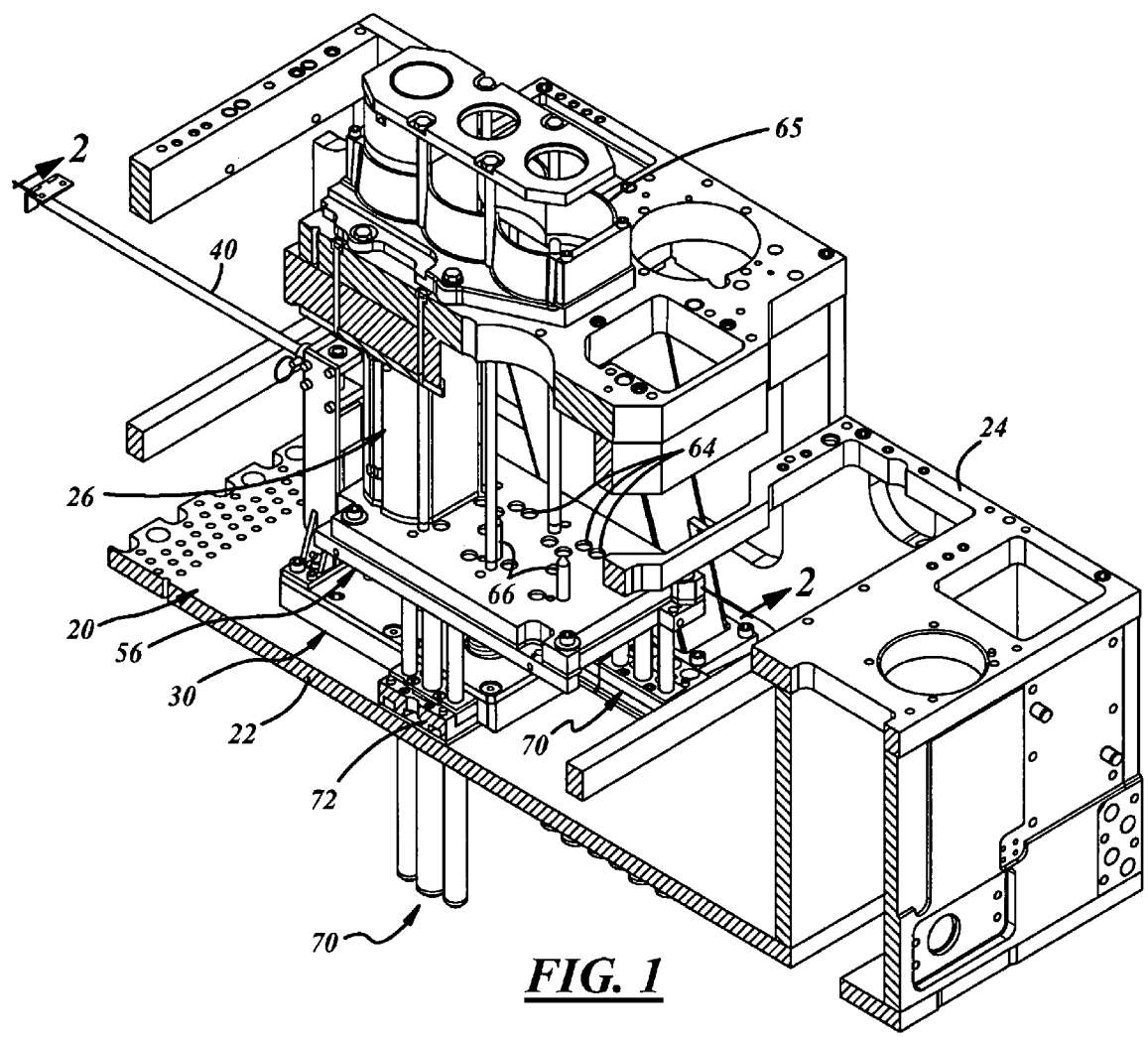
FIG. 1 is a partially sectioned perspective view of a section box frame in which a plunger foot assembly is mounted in accordance with an exemplary embodiment of the present disclosure.
Figure 2:
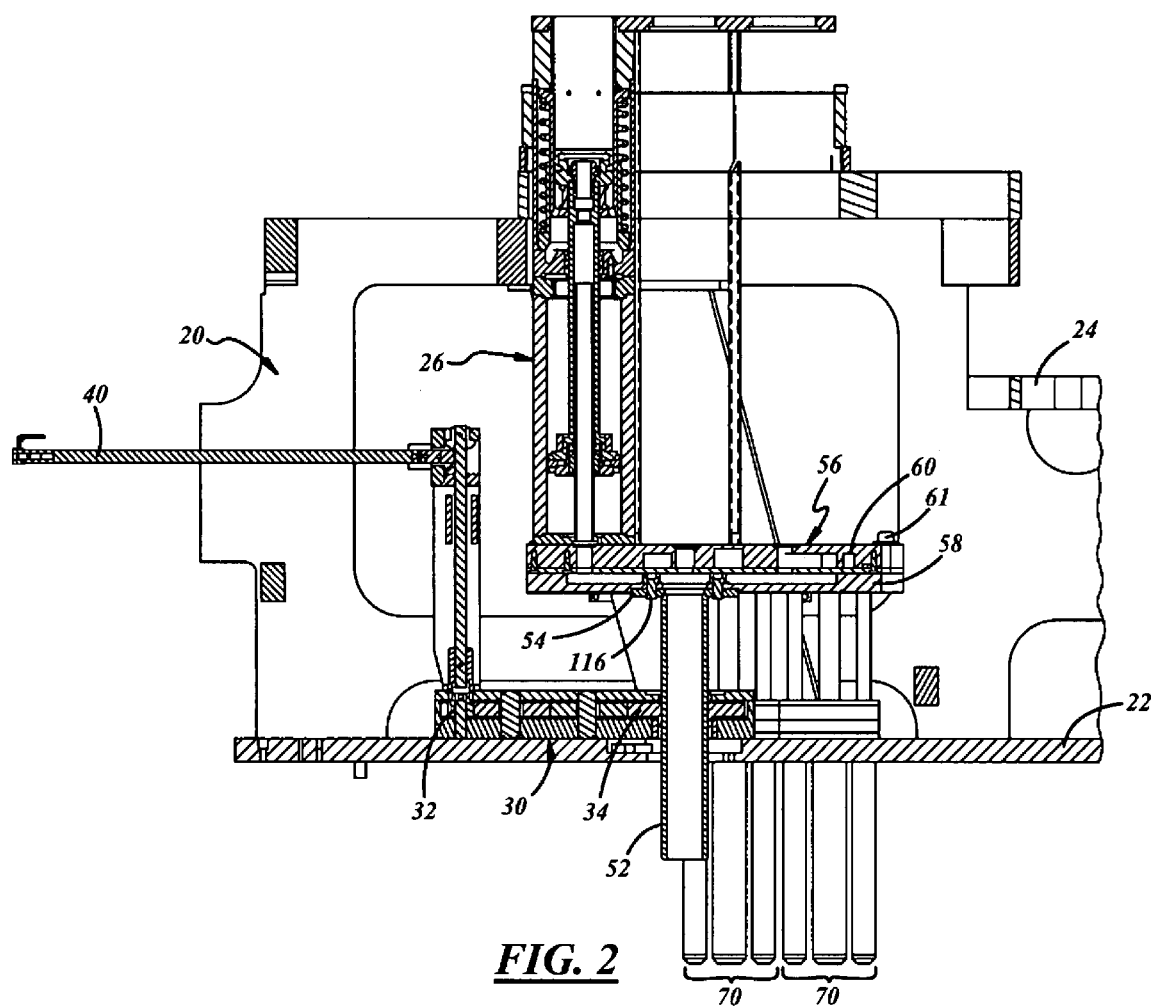
FIG. 2 is a fragmentary sectional view of the section box and the plunger foot assembly taken substantially along the line 2-2 in FIG. 1.

FIGS. 1-2 illustrate a plunger foot assembly 20 in accordance with an exemplary embodiment of the present disclosure mounted on the base plate 22 of a section box frame 24. The exemplary embodiment of plunger foot assembly 20 illustrated in the drawings is suitable or adapted for mounting three laterally aligned and spaced plungers 26, of which only one is illustrated in FIGS. 1 and 2. The plunger foot assembly of the present disclosure can readily be adapted for mounting one, two, four or more plungers. Section box frame 24 is part of an operating section of an individual section glassware press-and-blow glassware forming machine.

Figures 8, 9:
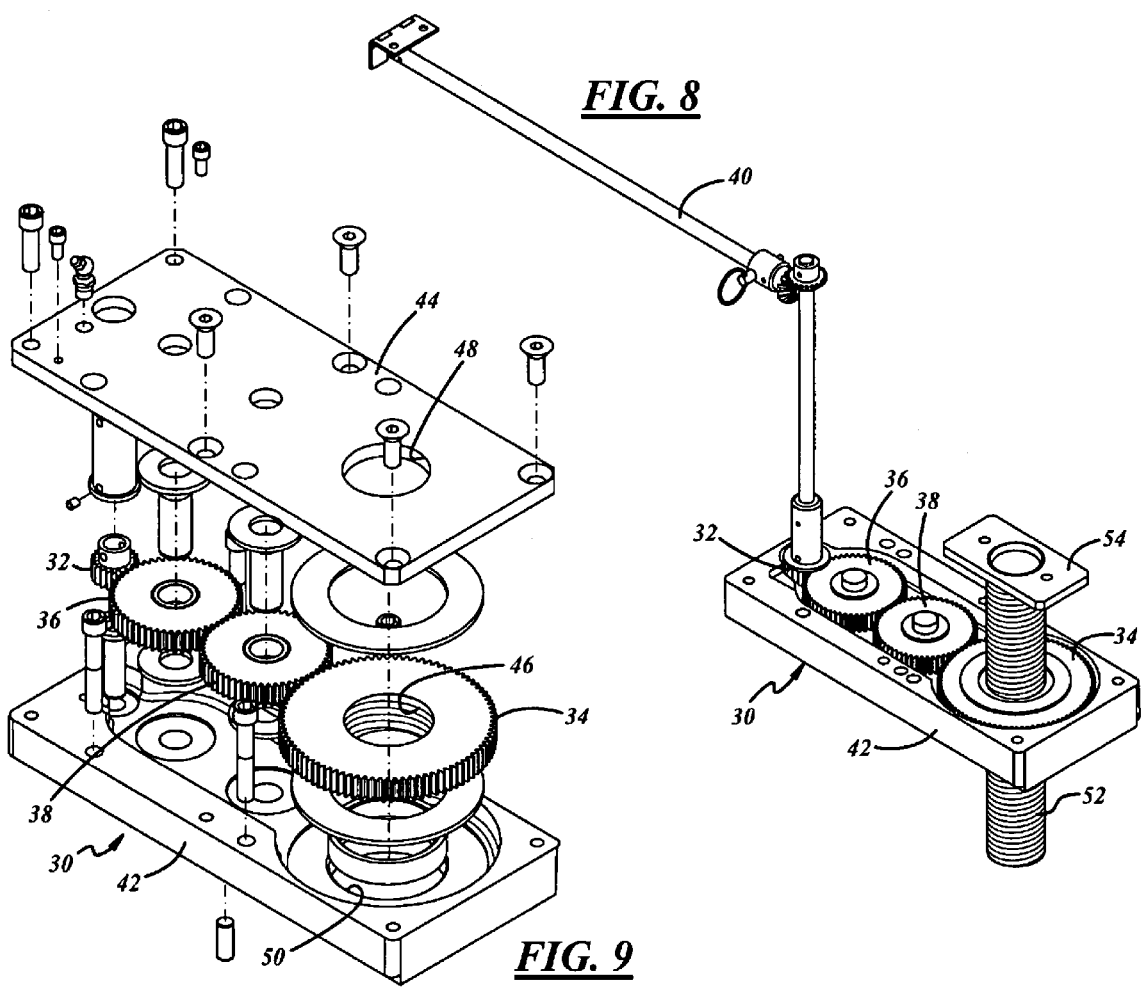
FIG. 8 is a fragmentary perspective view of the gearbox and gearbox drive in FIGS. 3 and 6.
FIG. 9 is an exploded perspective view of the gearbox in FIGS. 1-6 and 8.

Plunger foot assembly 20 includes a gearbox 30 mounted on section box base plate 22. Gearbox 30 preferably is preassembled, and includes an input gear 32 (FIGS. 8 and 9) coupled to an output gear 34 through one or more intermediate gears 36,38. Input gear 32 is coupled to an input device for selectively rotating the gears and thereby raising and lowering the machine plungers, as will be described. In the exemplary embodiment, this input device comprises a hand-operated crank 40, although motor or other actuator-driven inputs also are contemplated. Gears 32-38 are captured within a housing that includes a base 42 and a lid 44. The housing preferably is suitably sealed to capture lubricant within the housing.

Figure 5:
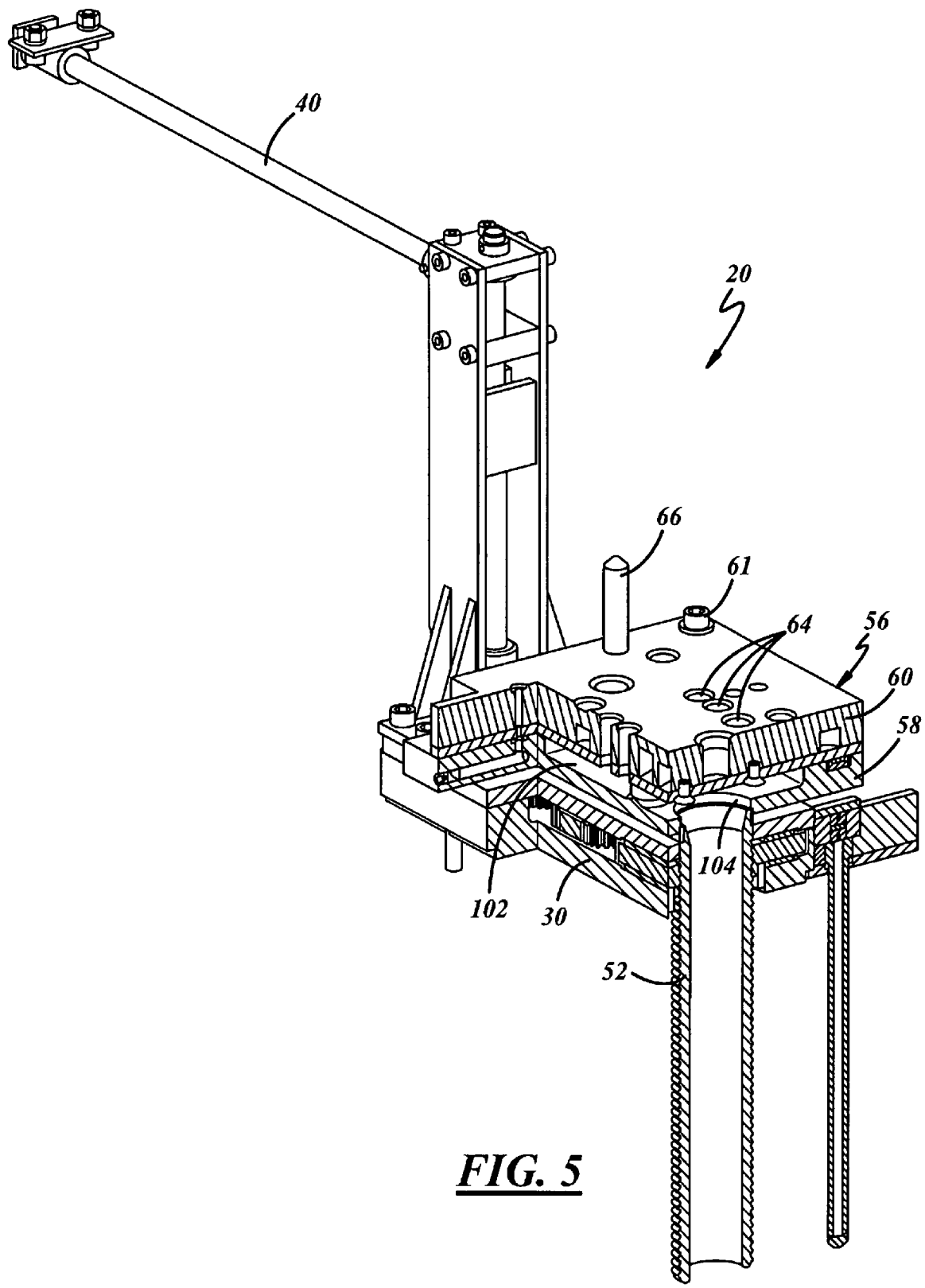
FIG. 5 is a fragmentary partially sectioned perspective view of the plunger foot assembly illustrated in FIGS. 3 and 4.

Output gear 34 has an internally threaded central opening 46 that aligns in assembly with an opening 48 in cover 44 and an opening 50 in base 42. A hollow externally threaded shaft 52 (FIGS. 2-3 and 5-8) extends through openings 48,50, and is threadably coupled to and extends from internally threaded center opening 46 of output gear 34. A mounting flange 54 can be secured to the upper end of hollow internally threaded shaft 52. A plunger support 56 is mounted on the upper end of hollow externally threaded shaft 52, preferably by being secured to shaft mounting flange 54. Plunger support 56 in the exemplary embodiment of the disclosure includes a plunger foot 58 to which a plunger sole plate 60 is mounted, such as by screws 61. The openings in sole plate 60 for screws 61 are slightly enlarged, and washers 63 underlie the heads of screws 61 to allow the sole plate to float with respect to plunger foot. In this way, the plungers 26 mounted on sole plate 60 are centered with the upper plunger collars 65 (FIG. 1) as the plungers are raised. Plunger sole plate 60 has an upper face 62 with a plurality of air outlet ports 64 (FIGS. 3 and 5) for feeding operating air (plunger up and plunger down) and plunger cooling air to plungers 26 (FIGS. 1 and 2) mounted on sole plate 60. Ports 64 also feed cooling air exhausted from plunger 26 to the interior of support 56, as will be described. Plunger sole plate 60 also can include pins 66 or the like for locating the plungers on the sole plate and aligning the air inlet and outlet ports on the bottom of the plunger with corresponding openings 64 in face 62 of sole plate 60.

Figure 3:
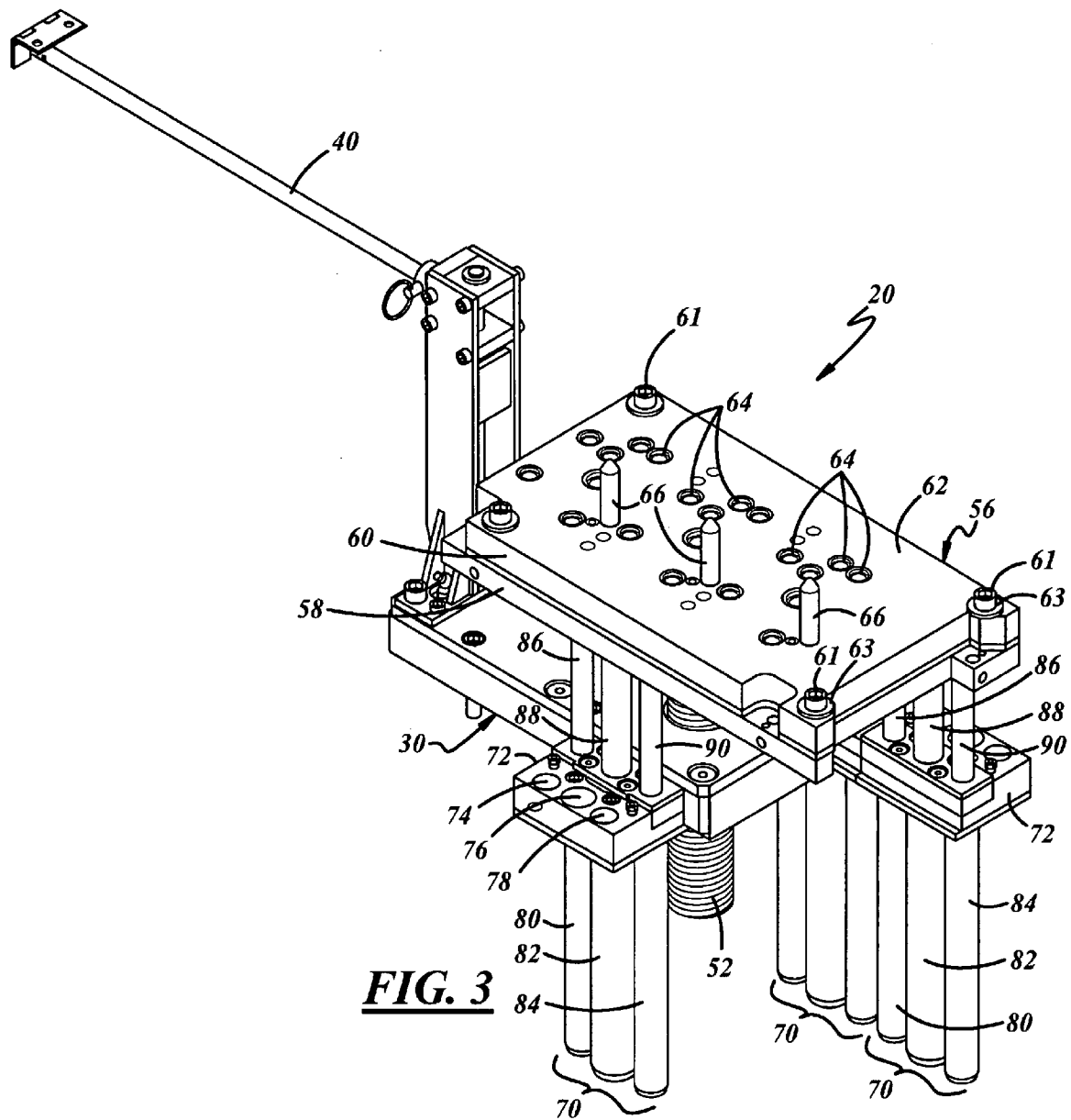
FIG. 3 is a perspective view of the plunger foot assembly in FIGS. 1 and 2 apart from the section box frame.
Figure 4:
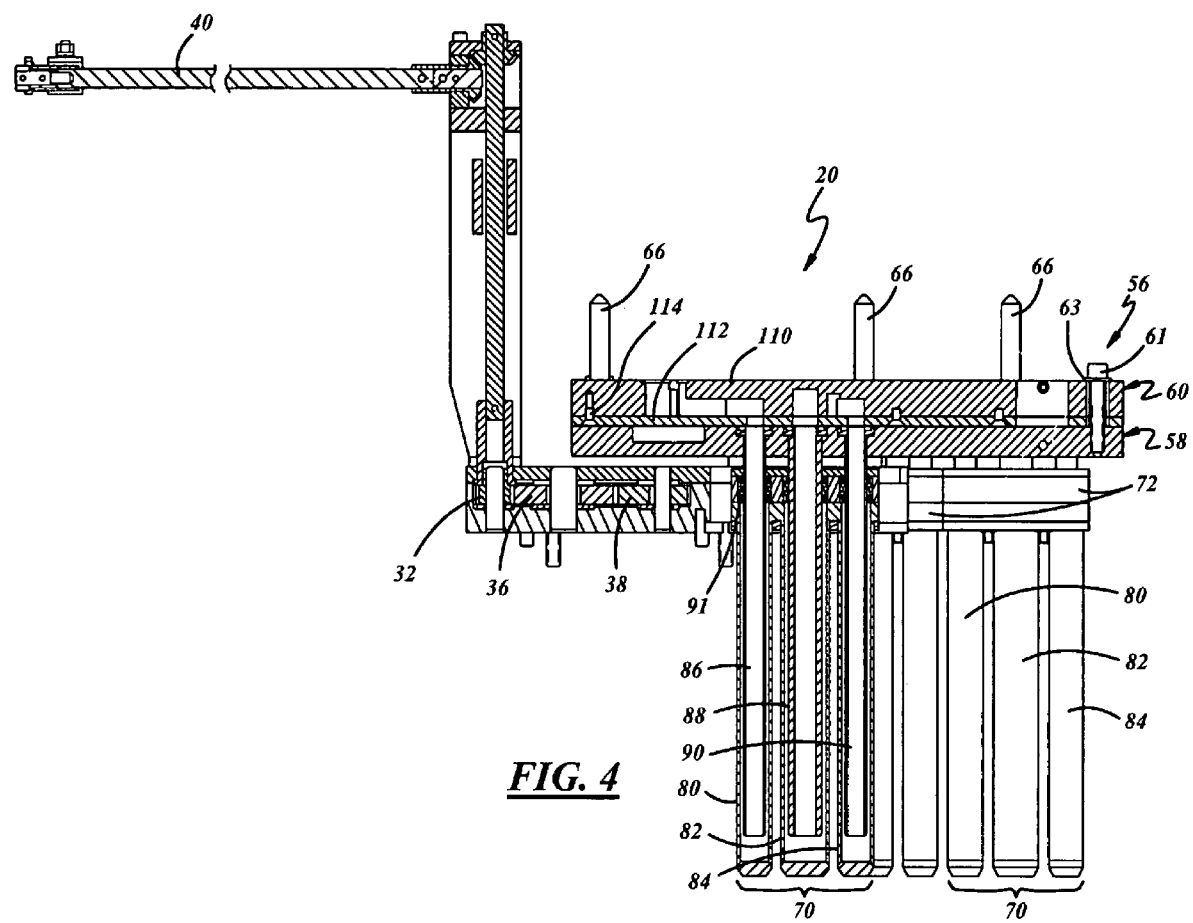
FIG. 4 is a sectional view of the plunger foot assembly illustrated in FIG. 3.

A telescoping tube assembly 70 is provided for each plunger position on sole plate 60. Thus, in the exemplary embodiment in which there are three plunger positions on sole plate 60, there are three telescoping tube assemblies 70 as best seen in FIG. 3. The telescoping tube assemblies preferably are identical. Each telescoping tube assembly 70 includes a base 72 for mounting on the section box base plate 20 as illustrated in FIGS. 1 and 2. Base 72 has input ports 74,76,78 for receiving plunger up, plunger down and plunger cooling air from suitable pneumatic control mechanisms. Outer tubes 80,82,84 have open upper ends connected within base 72 to inlet ports 74,76,78 respectively. The lower ends of outer tubes 80,82,84 are closed, as best seen in FIG. 4. Inner tubes 86,88,90 are slidably mounted by seals 91 within respective outer tubes 80,82,84. The lower ends of inner tubes 86,88,90 are open. The upper ends of the inner tubes likewise are open and extend through corresponding openings 92,94, 96 (FIG. 7) in plunger foot 58. The upper ends of inner tubes 86,88,90 are enlarged to capture such upper ends within sole plate openings. This preferably is accomplished by annular collars 98 secured around the open upper ends of inner tubes 86, 88, 90. Collars 98 seat within countersunk pockets in openings 92,94,96. An annular seal 100 is received within each collar 98 surrounding the upper end of the associated inner tube. When plunger sole plate 60 is secured to plunger foot 58 as illustrated in FIGS. 1-5, the upper ends of the inner tubes align with and sealingly surround corresponding air inlet openings on the undersurface of sole plate 60. Each such inlet opening connects with a corresponding passage in the sole plate that terminates at a port 64 in sole plate upper face 62. Thus, for example, plunger up, plunger down and plunger cooling air can be fed from inlet ports 74,78,76 in FIG. 6 through outer tubes 80,84,82 and inner tubes 86,90,88 to corresponding passages and ports in sole plate 60, and then to corresponding inlets of a plunger mounted on the sole plate.

Sole plate 60 in the exemplary embodiment includes a plate body 110 and a plate cover 112 secured by screws 114 to body 110. The air passages and the outlet ports 64 are machined or otherwise provided in plate body 64, and the inlet ports are provided in cover 112 to align with the ends of tubes 86,88,90 and the associated passages in plate body 110. This construction is exemplary.

Figure 6:
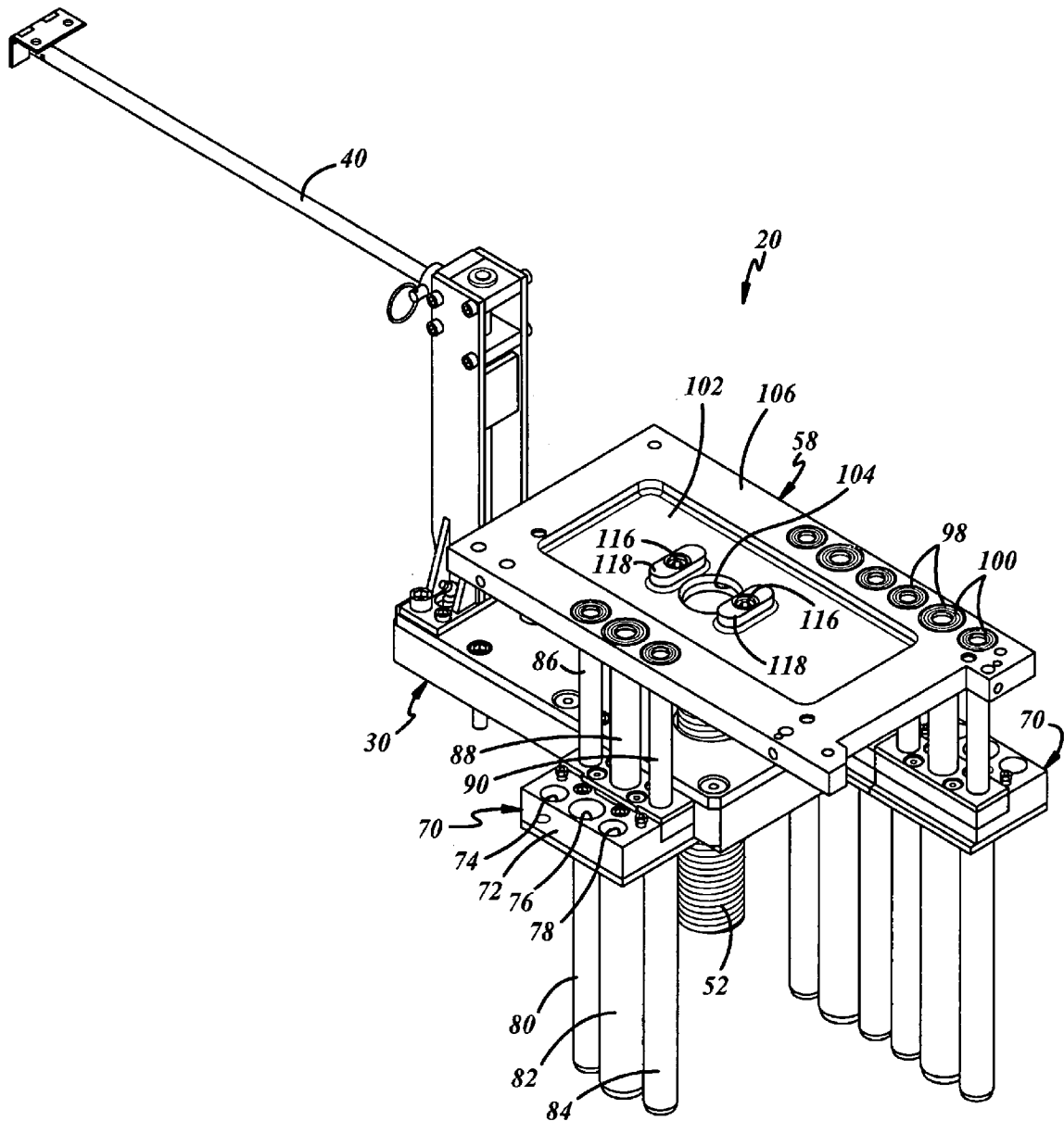
FIG. 6 is a perspective view of the plunger foot assembly in FIG. 3 with the plunger sole plate removed.
Figure 7:
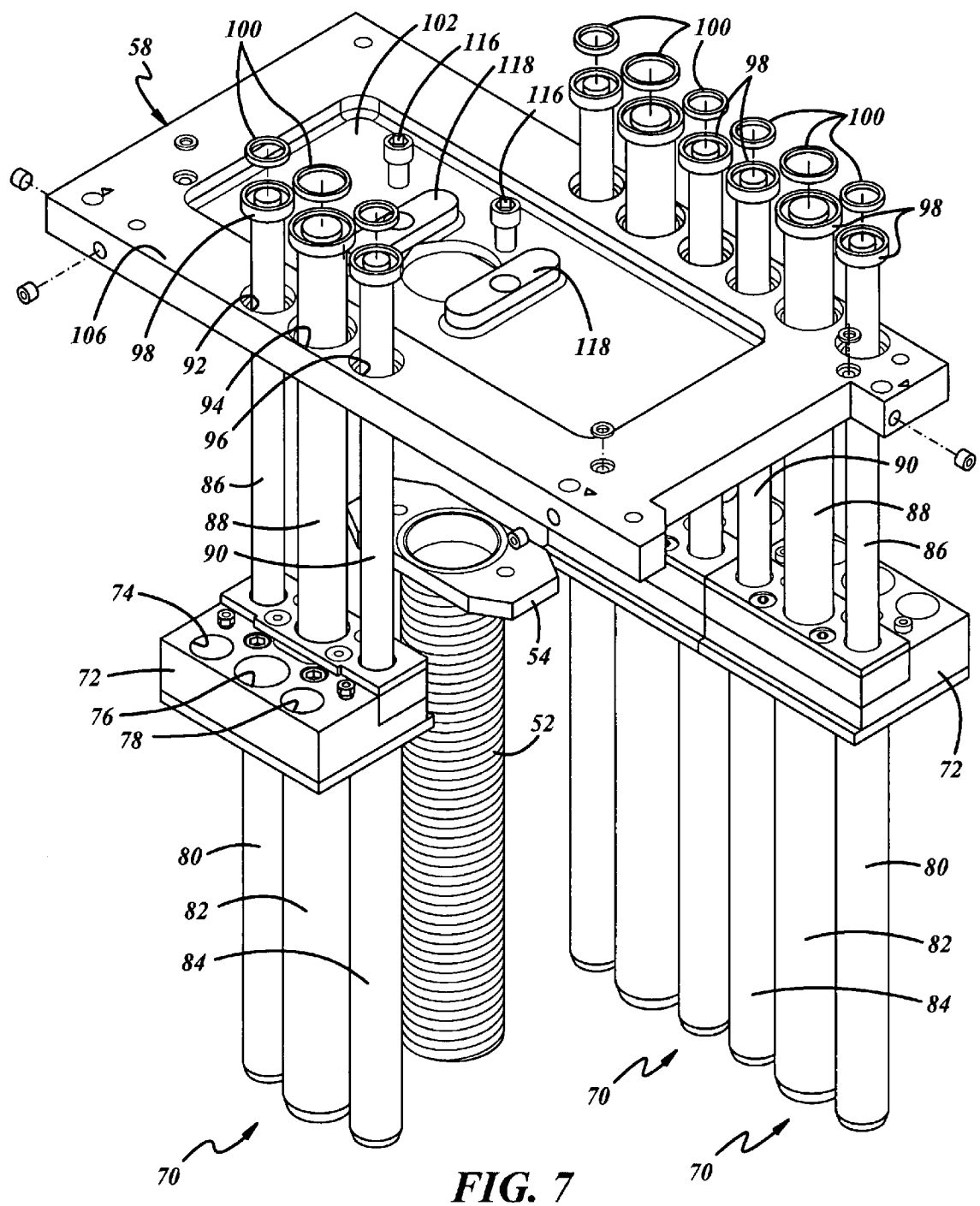
FIG. 7 is a partially exploded fragmentary perspective view of the plunger foot assembly in FIG. 6.

Plunger foot 58 preferably is substantially rectangular (as is plunger sole plate 60), and the upper surface of the plunger foot preferably includes a pocket 102 (FIGS. 6 and 7) that communicates through an opening 104 with the hollow interior of externally threaded shaft 52. All cooling air exhaust passages on sole plate 60 open into pocket 102. In the exemplary embodiment, shaft 52 is secured to the underside of plunger foot 58 by screws 116 that extend through embossments 118 in pocket 102. Pocket 102 preferably is centrally disposed in plunger foot 58 and is surrounded by a raised rim 106 through which inner tubes 86,88,90 extend. The countersunk pockets surrounding openings 92,94,96 (three sets in the exemplary embodiment with three plungers 26) thus are disposed in raised rim 106, as best seen in FIGS. 6 and 7. Cooling air exhausted from all plungers mounted on plunger sole plate 60 is fed through corresponding openings aligned with the cooling air exhaust ports in the plunger bases, and then through plunger sole plate 60 to the cavity formed by pocket 102 beneath sole plate 60. This plunger cooling exhaust air is fed from pocket 102 through opening 104, and then through the hollow interior of externally threaded shaft 52 and exhausted from the glassware forming machine.

Telescoping tube assemblies 70 thus provide for input of plunger up, plunger down and plunger cooling air to each plunger independent of the vertically adjusted position of the plungers. The telescoping tube assemblies also accommodate vertical adjustment of plunger foot 58, plunger sole plate 60 and plungers 26 mounted on plunger sole plate 60. This vertical adjustment is accomplished through gearbox 30 and hollow externally threaded shaft 52 on which plunger support 56 (preferably including plunger foot 58 and plunger sole plate 60) is mounted. Furthermore, plunger cooling exhaust air from all plungers is fed to a common exhaust through the hollow interior of externally threaded shaft 52. The plunger foot assembly of the present disclosure is usable in conjunction with glassware forming machines of differing sizes, and does not require use of hoses or the like for operating or cooling air. Preassembly of the gearbox allows use of fixed gears at fixed distances from each other. Tolerance issues are overcome and the likelihood of the gears jamming is greatly reduced. One plunger foot and mounting structure can function for a variety of machine sizes and/or plunger sizes and spacings. Plunger sizes and/or spacings can be varied by replacing the sole plate.

There thus has been disclosed a plunger foot assembly that fully satisfies all of the objects and aims previously set forth. The disclosure has been presented in conjunction with an exemplary embodiment, and modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A plunger foot assembly for mounting on a section box base plate of a glassware forming machine, which includes:
   a preassembled gearbox for mounting on the section box base plate, said preassembled gearbox having an input and an output gear with an internally threaded central opening,
   a hollow externally threaded shaft threadably coupled to and extending from said internally threaded central opening,
   a plunger support mounted on said hollow externally threaded shaft such that rotation of said output gear of said gearbox raises and lowers said plunger support, said plunger support having an upper face for mounting at least one plunger with air ports of the plunger opening at said face, said plunger support having air passages for feeding plunger up, plunger down and plunger cooling air to the air ports of a plunger mounted on said plunger support and a cooling air exhaust passage for feeding cooling air exhaust from a plunger mounted on said support to the hollow interior of said externally threaded shaft, and
   at least one telescoping tube assembly having a base for mounting on the section box base plate and telescoping tubes with inlet ports for receiving plunger up, plunger down and plunger cooling air, and outlets coupled to said air passages in said plunger support.

2. The plunger foot assembly set forth in claim 1 wherein said inlet ports of said at least one telescoping tube assembly are on said base of said telescoping tube assembly, and wherein said telescoping tube assembly includes outer tubes suspended from said base and having respective upper inlet ends connected to said inlet ports, and inner tubes slidable within said outer tubes and having respective upper outlet ends connected to said plunger support.

3. The plunger foot assembly set forth in claim 2 wherein said plunger support includes a plunger foot mounted on said hollow externally threaded shaft and a plunger sole plate mounted on said plunger foot, said plunger sole plate having air passages with inlet ends coupled to said upper outlet ends of said inner tubes and outlet ends on said upper face of said plunger sole plate for operative coupling to air inlet ports of a plunger mounted on said plunger sole plate.

4. The plunger foot assembly set forth in claim 2 wherein said plunger support has air passages and air exhausts for mounting three plungers on said support, and wherein said at least one telescoping tube assembly comprises three telescoping tube assemblies, one for each plunger mounted on said support.

5. The plunger foot assembly set forth in claim 1 wherein said telescoping tube assembly includes outer tubes having respective upper inlet ends connected to said inlet ports, and inner tubes slidable within said outer tubes and having respective upper outlet ends connected to said plunger support, wherein said plunger support includes a plunger foot mounted on said hollow externally threaded shaft and a plunger sole plate mounted on said plunger foot, said plunger sole plate having air passages with inlet ends coupled to said upper outlet ends of said inner tubes, wherein said upper outlet ends of said inner tubes extend through said plunger foot into sealing engagement with an undersurface of said plunger sole plate.

6. The plunger foot assembly set forth in claim 5 wherein said upper outlet ends of said inner tubes have enlarged ends that seat in pockets on said plunger foot in sealing engagement with said undersurface of said plunger sole plate.

7. The plunger foot assembly set forth in claim 6 wherein said enlarged ends include annular collars secured to said upper outlet ends of said inner tubes and annular seals carried by said collars for sealing engagement with said undersurface of said plunger sole plate.

8. The plunger foot assembly set forth in claim 7 wherein said sole plate is mounted to float with respect to said plunger foot.

9. The plunger foot assembly set forth in claim 5 wherein said plunger sole plate includes passages for feeding cooling air exhaust from plungers mounted on said plunger sole plate through said plunger foot to said hollow externally threaded shaft.

10. The plunger foot assembly set forth in claim 9 wherein said plunger foot includes an upper surface with a pocket surrounding an upper end of said hollow externally threaded shaft, and said plunger sole plate includes passages for feeding plunger exhaust air through said plunger sole plate to said pocket and thence to said hollow externally threaded shaft.

11. The plunger foot assembly set forth in claim 10 wherein said pocket on said upper surface of said plunger foot is centrally positioned in said plunger foot, and wherein said upper outlet ends of said inner tubes extend through said plunger foot at positions around a periphery of said plunger foot.

12. The plunger foot assembly set forth in claim 11 wherein said plunger support, including said plunger foot and said plunger sole plate, are rectangular.

* * * * *